No. 781,838. PATENTED FEB. 7, 1905.
L. P. LOWE.
APPARATUS FOR CLEANING GASES.
APPLICATION FILED JUNE 17, 1903.

WITNESSES
INVENTOR

No. 781,838.  Patented February 7, 1905.

UNITED STATES PATENT OFFICE.

LEON P. LOWE, OF SAN FRANCISCO, CALIFORNIA.

APPARATUS FOR CLEANING GASES.

SPECIFICATION forming part of Letters Patent No. 781,838, dated February 7, 1905.

Application filed June 17, 1903. Serial No. 161,796.

*To all whom it may concern:*

Be it known that I, LEON P. LOWE, a citizen of the United States, residing at San Francisco, in the county of San Francisco and State of California, have invented certain new and useful Improvements in Apparatus for Cleaning Manufactured Gases, of which the following is a specification.

My invention consists in an apparatus for giving a whirling motion to gas contained within a cylinder whereby foreign matters, such as tarry and other substances, are thrown from same by centrifugal force. Also for saturating with aqueous vapors light foreign substances contained within manufactured gases, so as to increase their specific gravity, and thus permit of their more easy removal.

My invention embodies novel features, as will be hereinafter fully set forth and definitely claimed.

In the manufacture of ordinary commercial gases the removal of the foreign substances contained therein is attended with more or less difficulty, and to overcome this I have devised an apparatus which greatly facilitates the process. I have found that very light foreign substances floating in gas are removed with much greater ease if they are first saturated with watery vapor to increase their specific gravity. I have also found that if gas is given a whirling motion the foreign substances contained therein are readily thrown from same by centrifugal force. I have found that the thorough saturation of the foreign substances, as described, is readily accomplished by bringing steam into contact therewith, and I prefer this method of accomplishing that work. I have also found that when steam is admitted in a suitable manner it can be made to give the desired whirling motion to the gas, as described above. The admission of steam to some gases is, however, disadvantageous if allowed to remain therein, and I have therefore found it desirable to condense and remove same from the gas prior to its final completion.

I accomplish the above-described processes in an apparatus which I have devised (shown in the accompanying drawings) and of which the following is a description.

Figure 1:
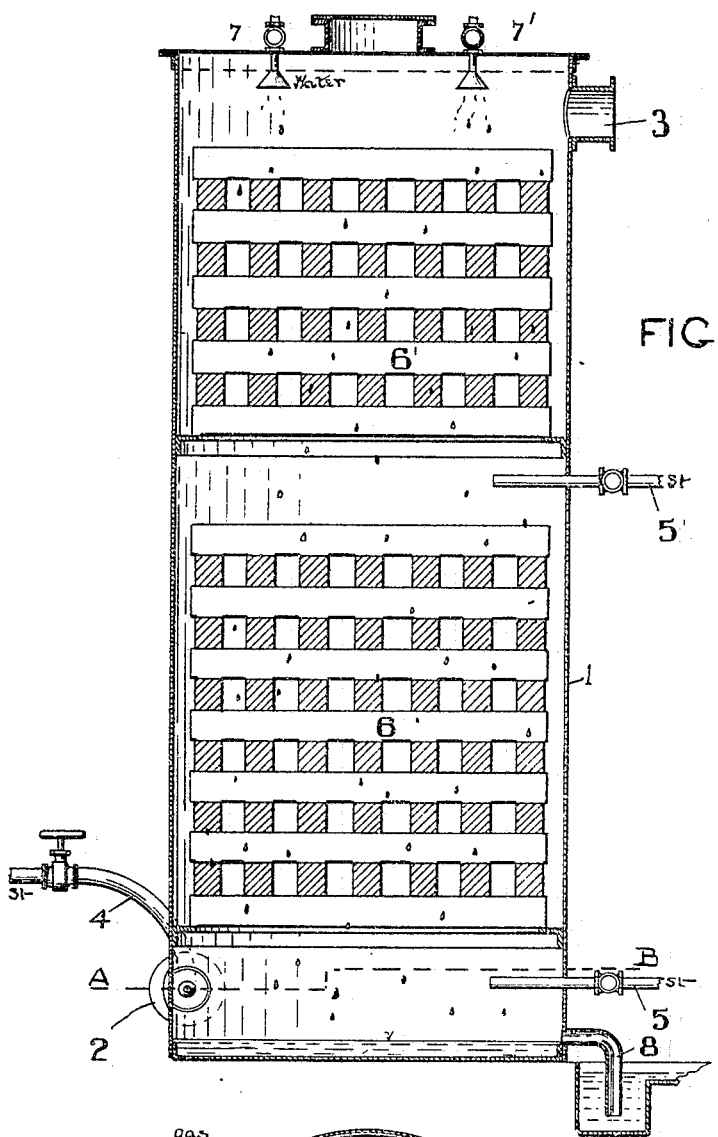
Figure 2:
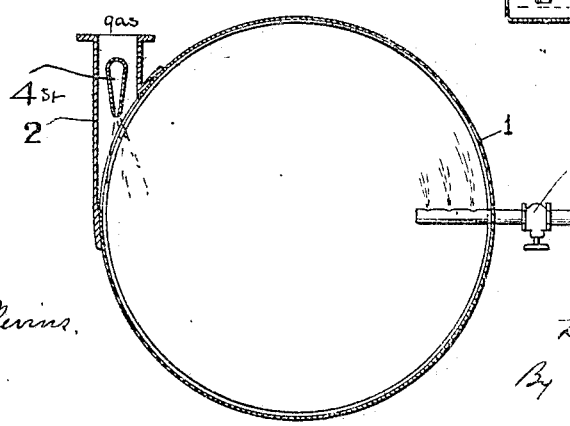

Figure 1 represents a vertical sectional elevation of the apparatus embodying my invention. Fig. 2 represents a plan of same on line A B of Fig. 1.

Similar numerals of reference indicate corresponding parts in both figures.

1 is a shell forming what I term a "gas-cleanser." It is preferably of cylindrical form and preferably composed of metal. 2 is a gas-inlet connection entering at bottom of same, so formed as to cause the gas to enter the shell 1 with a whirling motion.

3 is a gas-outlet at top of shell 1.

4 is a suitably-controlled steam-pipe entering the inlet connection 2.

5 and 5' are suitably-controlled steam-pipes entering shell 1 in such a manner as to project on the interior of same, the projection being provided with holes on side of same, through which steam issues in such a manner as to give a whirling motion to gas contained within the shell.

6 and 6' are masses of open-work substances contained within the shell 1, over which water is sprayed in a downward direction and among which gas passes in an upward direction.

7 and 7' are suitably-controlled water-spraying devices entering at top of shell 1. In number they may be as many as desired.

8 is an overflow-pipe dipping into an ordinary water seal and from which the water admitted through pipes 7 and 7' escapes from shell 1.

The operation of this apparatus is as follows: Gas enters the shell 1 at inlet connection 2, and because of the peculiar tangential position of the inlet connection 2 the gas is given a whirling motion as it enters. To assist in the more rapid motion of the gas and to saturate with watery vapor any foreign substances which may be contained therein, I admit steam through pipe 4. It is, however, not necessary to admit the steam at this point, although I prefer to do so. I also admit steam through pipe 5, the jets of same issuing therefrom causing the gas to circulate with a whirling motion, thus tending to throw therefrom by centrifugal force any solid substances which may be contained therein. The steam issuing through pipe 5 also tends to completely saturate the entering gas with aqueous vapor. Simultaneously with the admission of gas through pipe 2 and steam through pipes 4 and 5 I admit cold water through pipes 7 and 7', which water passing downward over the open-work substances 6' and 6 comes in contact with the gas and steam rising in an opposite direction, causing the condensation of the steam and its subsequent removal from the gas, which finally escapes through outlet 3 in a cooled and cleansed condition.

The process of whirling, steaming, and condensing can be performed in as many stages as desired—as, for instance, if after the gas has passed over the surfaces of the open-work material 6 it is again steamed and whirled by the admission of steam through pipe 5'.

This gas-cleanser can be of any convenient form and construction, and I do not limit myself to any particular design; but in ordinary operation I prefer the arrangement as shown.

I claim—

1. In an apparatus for cleaning manufactured gases, the combination of a chamber, means for admitting gas and steam into said chamber and for rotating said gas and steam therein and means for condensing said steam, substantially as described.

2. In an apparatus for cleaning manufactured gases, the combination of a chamber, a gas-inlet entering said chamber, and a steam-inlet entering said chamber obliquely to impart to said gas a whirling motion, substantially as described.

3. In an apparatus for cleaning manufactured gases, the combination of a chamber, means for admitting gas and steam into said chamber, and for rotating said gas and steam therein, open checker-work through which said gas and steam escape and a water-spray onto said open checker-work for condensing said steam, substantially as described.

4. In an apparatus for cleaning manufactured gases, the combination of a chamber, means for admitting gas and steam into said chamber, and for rotating said gas and steam therein, and a water-spray for condensing said steam, substantially as described.

5. In an apparatus for cleaning manufactured gases, the combination of a chamber, an oblique gas-inlet thereinto, a steam-jet for accelerating the motion of said gas, an independent oblique steam-inlet into said chamber, and means for condensing the steam, substantially as described.

6. In an apparatus for cleaning manufactured gases, the combination of a chamber, an oblique gas-inlet thereinto, a steam-jet for accelerating the motion of said gas, an independent oblique steam-inlet into said chamber, open checker-work between said inlets and the outlet for the gas, and a water-spray on said open checker-work, substantially as described.

7. In an apparatus for cleaning manufactured gases, the combination of a chamber, an inlet and an outlet for gas, a series of devices interposed between said inlet and outlet for introducing steam into said chamber and for imparting rotation to the commingled gas and steam, and a series of means alternating with said devices, for condensing the steam, substantially as described.

8. In an apparatus for cleaning manufactured gases, the combination of a chamber, an inlet and an outlet for gas, a series of devices interposed between said inlet and outlet for successively introducing steam obliquely into said chamber to impart a whirling motion thereto, and a series of means, alternating with said devices, for condensing the steam, substantially as described.

9. In an apparatus for cleaning manufactured gases, the combination of a chamber, an inlet and an outlet for gas, a series of devices interposed between said inlet and outlet for introducing steam into said chamber and for imparting rotation to the commingled gas and steam, and a series of piles of open checker-work, alternating with said devices, and means for spraying water thereon, to condense the steam, means alternating with said devices, for condensing the steam, substantially as described.

10. In an apparatus for cleaning manufactured gases, the combination of a chamber, an inlet and an outlet for gas, a series of devices interposed between said inlet and outlet for successively introducing steam obliquely into said chamber to impart a whirling motion thereto, and a series of piles of open checker-work, alternating with said devices, and means for spraying water thereon, to condense the steam, substantially as described.

In witness whereof I have hereunto set my hand in the presence of two subscribing witnesses.

L. P. LOWE.

Witnesses:
FRANCIS M. WRIGHT,
M. STUART.